Patented Oct. 28, 1952

2,615,788

UNITED STATES PATENT OFFICE 2,615,788

PURIFICATION OF BOROHYDRIDES OF THE ALKALI METALS

Thomas R. P. Gibb, Jr., Marblehead, Mass., assignor to Metal Hydrides Incorporated, Beverly, Mass., a corporation of Massachusetts No Drawing. Application November 14, 1949, Serial No. 127,239

4 Claims. (Cl. 23—14)

This invention relates to the preparation of sodium borohydride and borohydrides of other alkali metals and more especially to the purification of such borohydrides.

Borohydrides of the alkali metals can be produced by reacting an alkyl borate with an alkali metal hydride. The principal products of the reaction are the borohydride of the alkali metal and the alkoxide of the alkali metal. Thus, if methyl borate is brought in contact with sodium hydride while heated to a temperature of about 245° C. to 265° C. a mixture of sodium borohydride and sodium methoxide is produced. The reaction may be illustrated by the following equation:

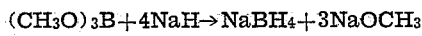

$(CH_3O)_3B + 4NaH \rightarrow NaBH_4 + 3NaOCH_3$

The sodium borohydride may be separated from the sodium methoxide by dissolving with isopropylamine or other preferably low boiling organic solvent which is a non-solvent for the sodium methoxide. The solution of sodium borohydride is removed from the insoluble sodium methoxide by filtration and the filtrate evaporated and dried under vacuum to obtain solid sodium borohydride.

The alkali metal borohydride produced as above described contains a substantial amount of impurities, the amount varying considerably from run to run. The removal of these impurities has presented a very difficult problem. The present invention contemplates a method for removing a considerable portion of these impurities.

In a copending application of Thomas R. P. Gibb, Jr. and Mario D. Banus, Serial No. 127,238, filed November 14, 1949 (now Patent No. 2,542,746 issued February 20, 1951), it is pointed out that some of these impurities had been introduced due to the presence of acetone in the isopropylamine and can be avoided by extracting the reaction product of the alkyl borate and alkali metal hydride with isopropylamine free of acetone.

Even when the sodium borohydride is separated from the sodium methoxide using isopropylamine free of acetone, a substantial amount of impurities still remain in the final product obtained. The present invention is based upon the discovery that at least a portion of these impurities can be reacted with diborane ($B_2H_6$) to form an alkyl borate. Thus, the impure alkali metal borohydride may be placed in a reaction vessel and diborane brought in contact with it for a suitable time and at a suitable temperature. The reaction usually proceeds at a temperature below room temperature but a temperature of 50° C. or even higher may be used. If desired, a quantity of diborane sufficient to react completely with the impurities may be introduced into the reaction vessel and in contact with the impure borohydride by means of a closed system, the diborane then remaining in contact with the borohydride until the reaction is complete. Alternatively, the diborane may be passed through or over a porous mass of the impure borohydride. After the reaction is complete, various low boiling or volatile products formed during the reaction may be removed by distillation or by pumping off in vacuum leaving a substantially pure alkali metal borohydride. It is possible in the case of low boiling alkyl borates such as methyl borate to conduct the reactions above the boiling point of said borate so that the latter is formed as a vapor which may be removed continuously.

It has been found that the impurities present in an alkali metal borohydride, such as sodium borohydride produced by reacting an alkyl borate, such as methyl borate with an alkali metal hydride, such as sodium hydride after removal of the alkali metal alkoxide interfere with or inhibit the reaction between the alkali metal borohydride and halide salts of other metals, such as aluminum, to form borohydrides of such other metals. Since the halide salts contain some hydrogen halide, some diborane is produced by reaction with the sodium borohydride. By bringing this diborane together with additional diborane, if necessary, in contact with the impure sodium borohydride the latter may be purified in situ in accordance with the present invention so that the reaction between the borohydride and the halide salt may proceed.

The product produced by reacting an alkyl borate with an alkali metal hydride consists essentially of the borohydride of the alkali metal and the alkoxide of the alkali metal together with certain impurities. These impurities remain with the alkali metal borohydride when the latter is removed from the alkali metal alkoxide by dissolving with isopropylamine but can be removed by bringing diborane in contact with the impure alkali metal borohydride in accordance with the present invention. It is known that an alkali metal borohydride is formed together with an alkyl borate by bringing diborane in contact with an alkali metal alkoxide, this being described in the patent to Hermann I. Schlesinger and Herbert C. Brown, No. 2,461,662, dated February 15, 1949. In accordance with a specific aspect of the present invention, diborane may be brought in contact with the reaction product produced by reacting an alkyl borate with an alkali metal hydride and containing the borohydride of the alkali metal and the alkoxide of the alkali metal together with certain impurities thereby removing said impurities and converting the alkoxide of the alkali metal to the borohydride, the low boiling or volatile products of the reaction being removed by distillation to recover a substantially pure alkali metal borohydride. Thus, in accordance with this aspect of the invention, diborane is brought in contact with the reaction product of an alkyl borate and an alkali metal hydride before the borohydride and the isopropylamine soluble impurities have been separated from the alkali metal alkoxide.

While my investigations have been confined to the purification of sodium borohydride produced by reacting methyl borate with sodium hydride, it is apparent that the invention is equally applicable to the purification of sodium borohydride and other alkali metal borohydrides, such as potassium, lithium, etc., produced by reacting an alkali metal hydride with other alkyl borates or borates of other monohydric alcohols, such as ethyl, propyl, isopropyl, butyl, isobutyl, borate, etc. Also, it is believed the invention is applicable to the purification of the alkali metal borohydrides produced by other methods, such as that described in the patents to Hermann I. Schlesinger and Herbert C. Brown, No. 2,461,661, No. 2,461,662 and No. 2,461,663, dated February 15, 1949.

As a general example of the practice of the invention, an alkali metal borohydride and diborane are reacted in a closed system essentially free from air. Closed reactors—equipped with agitators and provided with adequate distillation equipment and vacuum pumps—are suitable.

In conducting the process the impure alkali metal borohydride may be placed in the reactor, the reactor closed and air substantially completely removed by suitable means such as by evacuation or flushing with an inert gas such as nitrogen. This removal of air is required in order to avoid contact of air with diborane.

Thereafter diborane usually in gaseous state is delivered to the reactor and the reaction permitted to occur. This reaction normally takes place at room temperature although the reaction will proceed at temperatures as low as −80° C. and, if desired, may be conducted at an elevated temperature, for example, 50° C. or above. After the reaction is over, the low boiling or volatile products of the reaction are distilled off and the alkali metal borohydride recovered. An effective amount of diborane is about 25 per cent by weight based upon the weight of the total impurities in the impure product to be purified, for example, the isopropylamine soluble impurities in sodium borohydride.

The following specific example serves to illustrate further the practice of the invention.

Sodium borohydride obtained by reacting methyl borate and sodium hydride and extracting the reaction product with isopropylamine free of acetone and filtering, evaporating and drying the filtrate was used. This product of about 75 per cent purity in amount of 50 grams was placed in the reactor and the reactor was connected to a closed gas bulb containing 1150 c. c. of gaseous diborane, referred to standard conditions, the diborane having been previously condensed to solid form in the gas bulb by means of liquid nitrogen. The reactor was evacuated to substantially completely remove air and the connection to the filled gas bulb was opened. The temperature of the gas bulb was permitted to rise to room temperature, thereby converting the solid diborane to gaseous diborane. The temperature of the reactor was lowered to approximately −196° C. by means of a cooling means containing liquid nitrogen. As the temperature of the reactor was lowered, the diborane contained in the gas bulb passed into the reactor. The cooling means surrounding the reactor was removed and the temperature of the reactor permitted to rise to room temperature. After approximately 15 minutes from the time of removal of the cooling means from the reactor, the reaction was complete. After removal of unreacted traces of diborane and distillation of the low boiling impurities a yield of sodium borohydride of approximately 95 per cent purity was obtained.

I claim:

1. In a method for purifying an alkali metal borohydride produced by the reaction of an alkyl borate with an alkali metal hydride, the steps which comprise bringing diborane in contact with the borohydride produced by said reaction to react with the impurities therein and obtain a substantially pure alkali metal borohydride containing a low boiling reaction product, and removing the low boiling reaction product.

2. The method which comprises reacting an alkyl borate with an alkali metal hydride to form a reaction product consisting essentially of an alkali metal borohydride and an alkali metal alkoxide together with a considerable amount of impurities, bringing diborane in contact with said reaction product to react with said alkoxide and the major portion of said impurities and obtain a substantially pure alkali metal borohydride containing a low boiling reaction product, and removing the low boiling product.

3. In a method for purifying sodium borohydride produced by the reaction of an alkyl borate with sodium hydride, the steps which comprise bringing diborane in contact with the borohydride produced by said reaction to react with the impurities therein and obtain substantially pure sodium borohydride containing a low boiling reaction product, and removing the low boiling reaction product.

4. The method which comprises reacting an alkyl borate with sodium hydride to form a reaction product consisting essentially of sodium borohydride and sodium alkoxide together with a considerable amount of impurities, bringing diborane in contact with said reaction product to react with said alkoxide and the major portion of said impurities to obtain a substantially pure sodium borohydride containing a low boiling reaction product, and removing the low boiling product.

THOMAS R. P. GIBB, Jr.

REFERENCES CITED

The following references are of record in the file of this patent:

UNITED STATES PATENTS

| Number | Name | Date |
|---|---|---|
| 2,461,662 | Schlesinger | Feb. 15, 1949 |